Dec. 28, 1943. G. W. SCHATZMAN 2,337,627
LOCKING ASSEMBLY FOR AUTOMOBILE WHEELS AND PARTS THEREOF
Filed Feb. 6, 1942 2 Sheets-Sheet 1
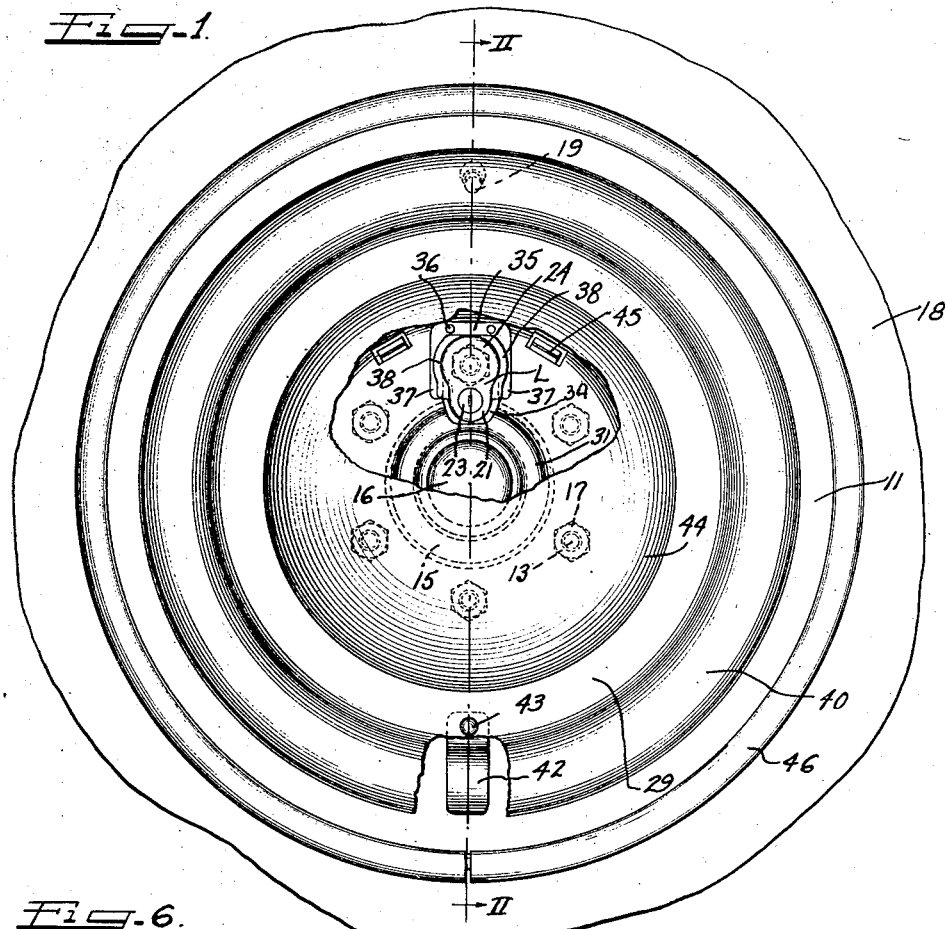
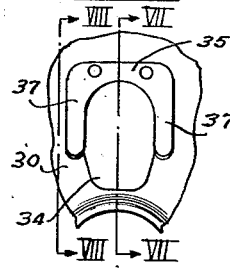
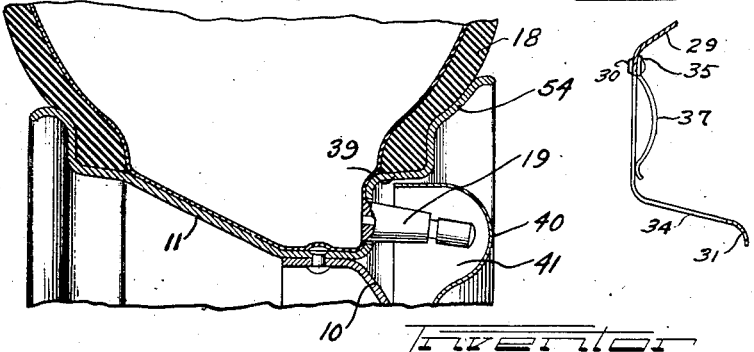
Inventor
GEORGE W. SCHATZMAN.

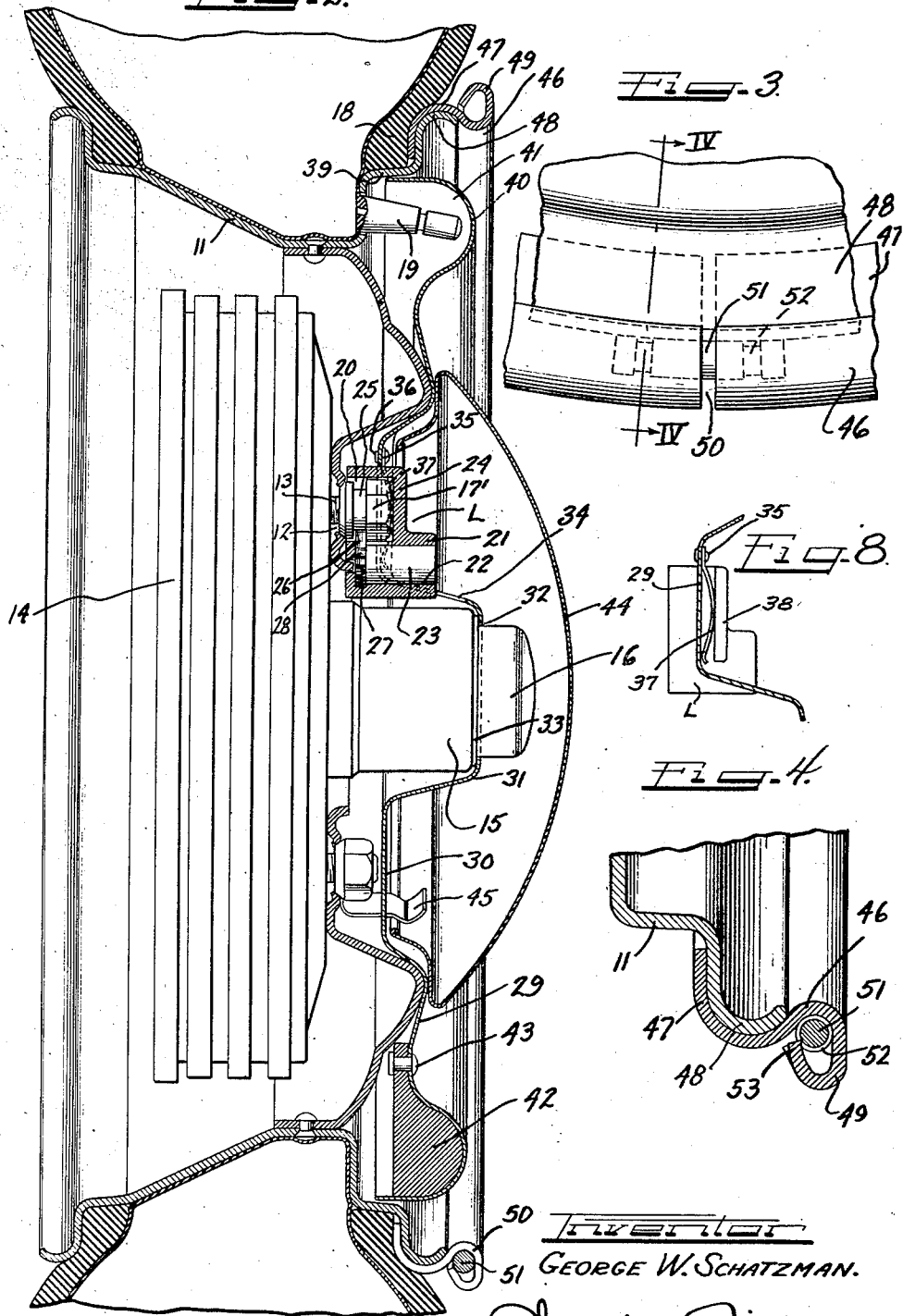

Patented Dec. 28, 1943

2,337,627

UNITED STATES PATENT OFFICE 2,337,627

LOCKING ASSEMBLY FOR AUTOMOBILE WHEELS AND PARTS THEREOF

George W. Schatzman, Detroit, Mich., assignor to Houdaille-Hershey Corporation, Detroit, Mich., a corporation of Michigan Application February 6, 1942, Serial No. 429,775

6 Claims. (Cl. 70—259)

This invention relates to locking assembly for frustrating and preventing unlawful removal of wheels from automobiles or the removal of tires from the wheels for purposes of theft.

The object of my invention is to provide simple but efficient locking assembly which will frustrate removal of a wheel from the car, or the removal of the tire from the wheel. More specifically, the object is to provide a lock structure for one of the wheel securing bolts to prevent access thereto, and with said locking structure functioning also to hold a locking cover in place for locking the wheel hub cap against removal and the tire air nipple against access, together with other means which will prevent removal of the wheel tire, even when deflated, from the wheel rim in a direction outwardly of the wheel.

The various features of my invention are incorporated in the structure shown on the drawings, in which:

Figure 1 is a front elevation of a wheel with the locking elements applied thereto;

Figure 2 is an enlarged section on plane II—II of Figure 1;

Figure 3 is a front view of the end portion of a tire locking ring and means for holding it closed;

Figure 4 is a section on plane IV—IV of Figure 3;

Figure 5 is a section like Figure 2 showing a modified arrangement of tire locking means, Figure 6 is a front elevation of a portion of the locking plate and the lock receiving spring plate thereon;

Figure 7 is a section on plane VII—VII Figure 6; and

Figure 8 is a section on plane VIII—VIII Figure 6, with the lock applied.

The wheel shown is of a well known type comprising the annular sheet metal disk 10 to which the rim 11 is secured and which is deflected inwardly at its middle portion and provided with bolt holes 12 for receiving threaded studs 13 on the brake drum 14 from which extends the wheel hub 15 for which a hub cap 16 is usually provided. The threaded studs receive nuts 17 for securing the disk to the brake drum, or instead of threaded studs on the brake drum, the drum may have threaded holes for receiving headed screws for engaging the wheel disk to secure it in place on the drum. The rim 11 supports a rubber tire 18 from whose inner tube extends a nipple 19.

The locking assembly comprises primarily a lock structure L for locking one of the wheel securing nuts or bolts against access by wrenches or other tools. The nut or bolt 17' which is to be locked is provided with a locking channel 20. The lock structure shown comprises the body 21 having the bore 22 for a key operable tumbler barrel 23. The body 21 has the extension 24 having the recess 25 for receiving the nut or bolt head, and in the bottom of the body 21 a lock bolt 26 is shiftable outwardly by a spring 27 to engage with its end in the channel 20 to thus hold the lock structure to the nut or bolt and prevent access to the nut or bolt by wrenches or other tools. The tumbler barrel 23 has the cam pin 28 engageable with the bolt for release thereof from the bolt head or nut for removal of the lock structure.

In order to frustrate removal of the hub cap 16 for access to the wheel spindle (not shown) for removal of the wheel, and for preventing access to the tire nipple for deflation of the tire, I provide a locking plate or disk 29 preferably of sheet metal. The middle portion 30 of this locking disk or cover is deflected inwardly to extend a distance into the wheel disk 10, the central portion 31 being deflected outwardly to receive the wheel hub 15. The outer wall of the deflected portion 31 has the passageway 32 through which the hub cap 16 extends, this outer wall being disposed in front of the hub cap flange 33 when the disk or cover 29 is held in place, so as to prevent removal of the hub cap.

The disk or cover 29 is held in its guard or locking position by the lock structure L. The lock structure may be permanently secured to the cover 29, or, as shown, an opening 34 may be provided in the parts 30 and 31 of the cover 29 for receiving the lock structure. A U-shaped spring plate 35 is secured by its yoke to the cover part 30 above the opening 34, as by rivets or welding 36, the legs 37 of the spring frame extending radially inwardly along the opposite sides of the lock structure part 24 behind the flanges 38 thereon, the spring legs being preferably bowed so that when the lock structure is locked to the nut or bolt head, the spring plate structure will be tensed to hold the disk or cover 29 against the wheel disk 10 with the cover portion 31 positioned to lock the hub cap 16 against removal.

The cover structure 29 is of a diameter to fit into the outer base portion 39 of the rim 11, and the outer portion 40 of the cover is deflected outwardly to be of substantially semi-circular cross section, so that the cover with the wheel rim and disk forms an enclosure 41 for the nipple 19 to prevent access to the nipple for purpose of deflation of the tire with intent to steal the tire from the rim. As shown, the nipple 19 is located radially outwardly from the bolt or nut on which the lock structure L is applied, and in order to offset the weight of the lock structure and nipple and to balance the wheel, a suitable counterweight 42 may be secured to the cover 29 as by means of a rivet 43.

A dust cap or cover 44 is usually provided to be detachably secured to the wheel by spring clips 45 extending from the wheel disk 10.

In addition to the wheel locking means described, I also provide locking means for preventing removal of the tire, even when deflated, from the wheel, unless the wheel is removed from the car. This tire locking means is in the form of a ring 46 of generally ogee cross section with its inner part 47 of arcuate cross section for fitting against the inner surface of the outer lip 48 of the rim, the outer portion of the ring being of substantially tubular cross section and extending radially beyond the lip 48 a sufficient distance to prevent removal of the tire, even when deflated, from the wheel in a direction outwardly of the wheel. The ring has the opening or split 50 so that it can be spiraled into place on the rim before the tire is applied, and after such application, the ring ends are locked together by a pin 51 which has channels 52 at its ends into which portions 53 of the ring are deflected as shown in Figure 4, this locking of the ring holding it securely and snugly clamped and contracted into position on the wheel rim.

Instead of having a separate ring for locking the tire against removal, the arrangement shown in Figure 5 may be employed in which the outer lip 54 of the rim is extended radially a sufficient distance to prevent removal of the tire, when deflated, from the rim outwardly of the wheel.

With the locking means for the tire shown and described, the tire, when deflated, can be removed from the wheel only inwardly thereof, but then the tire will surround the axle of the car and cannot be removed or stolen unless the wheel disk is detached from the brake drum or the spindle nut is removed for removal of the entire wheel structure from the car. This is, however, frustrated by the lock structure L which locks one of the wheel supporting bolts or nuts against access and which holds the cover 29 in locking position for locking the hub cap against removal for access to the wheel spindle. When the cover 29 is locked in position by the lock structure L, the other wheel securing nuts or bolts, in addition to the bolt or nut locked by the lock structure L, will be inaccessible.

I have shown and described practical and efficient embodiments of the features of my invention, but I do not desire to be limited to the exact structure and arrangement shown and described, as changes and modifications may be made without departing from the scope of the invention.

I claim as follows:

1. Locking assembly for an automobile wheel of the type shown, comprising a lock structure for receiving and enclosing one of the wheel supporting bolts to lock the bolt against access and having abutments thereon, a locking cover having an opening for receiving said lock structure, a securing member on said locking cover having spring arms extending alongside said opening to be engaged by said lock structure abutment to thereby hold said locking cover against the wheel for locking the other wheel bolts against access, the central portion of said locking cover being shaped to engage with the wheel hub cap to lock the cap against removal, the outer portion of said locking cover being shaped to cooperate with the wheel to form an enclosure for the wheel tire nipple to lock the nipple against access.

2. Locking assembly for an automobile wheel of the type shown, comprising a lock structure having side flanges and applied to one of the wheel securing bolts to lock the bolt against access, a locking cover having an opening for receiving said lock structure, a U-shaped spring plate secured at its yoke to the lock cover and having its legs engaged by the lock structure side flanges whereby said cover is locked and urged against the outer side of the wheel to lock the other wheel bolts against access.

3. Locking assembly for an automobile wheel of the type shown, comprising a lock structure having side flanges and applied to one of the wheel securing bolts to lock the bolt against access, a locking cover having an opening for receiving said lock structure, a U-shaped spring plate secured at its yoke to the lock cover and having its legs engaged by the lock structure side flanges whereby said cover is locked and urged against the outer side of the wheel to lock the other wheel bolts against access, said locking cover at its central portion being deflected outwardly to enclose the wheel hub and having an abutment for extension in front of the hub cap to lock the cap against removal.

4. Locking assembly for an automobile wheel of the type having the central portion of its disk offset inwardly and apertured to receive bolts for securing it to a brake drum and supporting a rim having an outwardly extending tire supporting flange within which the tire nipple extends, comprising a sheet metal locking cover engaging against the outer side of the wheel disk and having its central portion deflected rearwardly in said inwardly offset portion of the wheel disk and having an opening in alignment with one of the bolts which secures the wheel disk to the brake drum, a key operable lock structure extended through said cover opening to receive and be locked to said one wheel securing bolt to lock said bolt against access, abutments on said lock structure and spring arms on said locking cover engaged by said abutments when said lock structure is applied to said bolts whereby said locking cover is held against the outer side of the wheel disk to enclose the remaining wheel securing bolts against access.

5. Locking assembly for an automobile wheel of the type having the central portion of its disk offset inwardly and apertured to receive bolts for securing it to a brake drum and supporting a rim having an outwardly extending tire supporting flange within which the tire nipple extends, comprising a sheet metal locking cover engaging against the outer side of the wheel disk and having its central portion deflected rearwardly in said inwardly offset portion of the wheel disk and having an opening in alignment with one of the bolts which secures the wheel disk to the brake drum, a key operable lock structure extended through said cover opening to receive and be locked to said one wheel securing bolt to lock said bolt against access, abutments on said lock structure and spring arms on said locking cover engaged by said abutments when said locking structure is applied to said bolts whereby said locking cover is held against the outer side of the wheel disk to enclose the remaining wheel securing bolts against access, the central portion of the rearwardly deflected portion of said locking cover being deflected forwardly to receive and surround the wheel hub and hub cap to prevent removal of the hub cap for access to the interior of the wheel hub.

6. Locking assembly for an automobile wheel of the type having the central portion of its disk offset inwardly and apertured to receive bolts for securing it to a brake drum and supporting a rim having an outwardly extending tire supporting flange within which the tire nipple extends, comprising a sheet metal locking cover engaging against the outer side of the wheel disk and having its central portion deflected rearwardly in said inwardly offset portion of the wheel disk and having an opening in alignment with one of the bolts which secures the wheel disk to the brake drum, a key operable lock structure extended through said cover opening to receive and be locked to said one wheel securing bolt to lock said bolt against access, abutments on said lock structure and spring arms on said locking cover engaged by said abutments when said lock structure is applied to said bolts whereby said locking cover is held against the outer side of the wheel disk to enclose the remaining wheel securing bolts against access, the peripheral portion of said locking cover being deflected outwardly and then inwardly for telescoping engagement in the outer flange of the wheel rim and to form an annular space for receiving the tire nipple whereby to lock the nipple against access.

GEORGE W. SCHATZMAN.